United States Patent [19]

Schwarz

[11] 4,259,460

[45] Mar. 31, 1981

[54] RUBBERY COMPOSITIONS

[75] Inventor: Herbert F. Schwarz, Sarnia, Canada

[73] Assignee: Polysar Limited, Ontario, Canada

[21] Appl. No.: 100,299

[22] Filed: Dec. 5, 1979

[30] Foreign Application Priority Data

Dec. 29, 1978 [CA] Canada ................................... 318837

[51] Int. Cl.³ .......................... C08L 9/02; C08L 9/06; C08L 37/00
[52] U.S. Cl. ................................... 525/208; 525/209; 525/213; 525/217; 525/222; 525/223; 525/228; 525/232; 525/234; 525/235; 525/238; 525/239
[58] Field of Search ............... 525/208, 209, 213, 217, 525/222, 223, 228, 232, 234, 235, 238, 239

[56] References Cited

U.S. PATENT DOCUMENTS

| 3,642,954 | 2/1972 | Turner | 525/234 |
| 4,138,389 | 2/1979 | Edwards | 525/234 |

FOREIGN PATENT DOCUMENTS

| 853804 | 2/1960 | United Kingdom | 525/234 |
| 866294 | 4/1961 | United Kingdom | 525/234 |

Primary Examiner—J. Ziegler
Attorney, Agent, or Firm—Stevens, Davis, Miller & Mosher

[57] ABSTRACT

Improved rubbery compositions comprise vinyl chloride polymers, butadiene-acrylonitrile polymers and butadiene-styrene-tertiary amine polymers. Such compositions may be compounded and vulcanized and the vulcanizates may be used in hoses, rolls and gaskets.

9 Claims, No Drawings

RUBBERY COMPOSITIONS

This invention relates to rubbery compositions and in particular to rubbery compositions comprising mixtures of synthetic rubbers with polyvinyl chloride compositions.

Vinyl chloride polymers are well known. Such compositions exhibit a low impact strength, making them unsuitable for use as articles which may be subjected to impact during use. It is well known that the impact strength of vinyl chloride polymers may be improved by the addition of rubbery plasticizers, especially butadiene-acrylonitrile rubbers. It is also known in the art to add butadiene-styrene rubbers to mixtures of vinyl chloride polymers and butadiene-acrylonitrile rubbers, such mixtures generally being rubbery in nature except when the vinyl chloride polymer content exceeds about 65% by weight of the mixture. Such mixtures may be vulcanized by conventional methods.

I have now discovered improved rubbery compositions which comprise mixtures of vinyl chloride polymers and synthetic rubbers, the improvement being the use as synthetic rubbers of either a butadiene-acrylonitrile polymer or a butadiene-acrylonitrile polymer containing bound hydroxy or epoxy groups and a butadiene styrene polymer containing bound tertiary amine groups which tertiary amine groups (hereinafter butadiene-styrene-tertiary amine polymer) have been reacted with a halogen-containing compound.

The rubbery compositions of my invention comprise, per 100 parts by weight of polymers, from about 15 to about 50 parts by weight of a vinyl chloride polymer, from about 10 to about 50 parts by weight of a butadiene-acrylonitrile polymer and from about 20 to about 60 parts by weight of a butadiene-styrene-tertiary amine polymer, said butadiene-styrene-tertiary amine polymer containing from about 0.5 to about 10 millimoles of bound tertiary amine groups per 100 grams of polymer and having been reacted with a dihalogen compound capable of forming quaternary ammonium salts with the tertiary amine groups.

A preferred rubbery composition comprises, per 100 parts by weight of polymers, from about 15 to about 50 parts by weight of a vinyl chloride polymer, from about 10 to about 50 parts by weight of a butadiene-acrylonitrile polymer containing from about 4 to about 60 millimoles of bound epoxy or hydroxy groups per 100 grams of polymer, and from about 20 to about 60 parts by weight of a butadiene-styrene-tertiary amine polymer containing from about 0.5 to about 10 millimoles of bound tertiary amine groups per 100 grams of polymer, said butadiene-styrene-tertiary amine polymer having been reacted with a dihalogen compound capable of forming quaternary ammonium salts with the tertiary amine groups.

Vinyl chloride polymers are well known in the art and include polymers of vinyl chloride and polymers of vinyl chloride and up to about 10 weight percent of other copolymerizable chlorinated monomers. Such polymers are generally manufactured by an emulsion or a suspension polymerization process.

Butadiene-acrylonitrile polymers are well known in the art and are polymers containing from about 85 to about 50 weight percent of butadiene and from about 15 to about 50 weight percent of acrylonitrile. The butadiene-acrylonitrile polymers that I prefer to use contain from about 80 to about 60 weight percent of butadiene and from about 20 to about 40 weight percent of acrylonitrile. Such polymers are manufactured by an emulsion free radical polymerization process.

The butadiene-acrylonitrile polymers containing bound hydroxy or epoxy groups are manufactured by an emulsion free radical polymerization process and contain from about 85 to about 50 weight percent of butadiene and from about 15 to about 49 weight percent of acrylonitrile, preferably from about 80 to about 60 weight percent of butadiene and from about 20 to about 40 weight percent of acrylonitrile, and sufficient of a hydroxy or epoxy-containing monomer to provide, per 100 grams of polymer, from about 4 to about 60 millimoles of bound epoxy groups or hydroxy groups. Suitable hydroxy or epoxy containing monomers are copolymerizable monomers selected from olefin-epoxide monomers such as glycidyl acrylate, glycidyl methacrylate, vinyl cyclohexene monoxide, allyl glycidyl ether and methallyl glycidyl ether, and from olefin-hydroxy monomers such as hydroxyethyl acrylate or methacrylate, hydroxypropyl acrylate or methacrylate, hydroxypropyl crotonate, di(2-hydroxyethyl) maleate or fumarate and hydroxyethyl vinyl ether.

The butadiene-styrene-tertiary amine polymers that I use are known and are manufactured by an emulsion free radical polymerization process. The polymers contain from about 85 to about 70 weight percent of butadiene, from about 15 to about 30 weight percent of styrene, and sufficient of a tertiary amine monomer to provide from about 0.5 to about 10 millimoles of bound tertiary amine groups per 100 grams of polymer. Said tertiary amine monomer may be selected from acrylates and methacrylates of the general formula

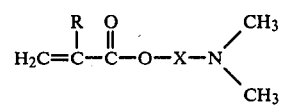

where R represents hydrogen or methyl and X represents an aliphatic hydrocarbon group of 2 to 4 carbon atoms. Said polymer has been reacted with a dihalogen compound capable of forming quaternary ammonium salts with the tertiary amine groups. Suitable such dihalogen compounds may be selected from dibromobutene-2, α,α'-dibromo-p-xylene, 4,4'-bis(chloromethyl) phenyl ether, 4,4'-bis(bromomethyl) phenyl ether, 4,4'-bis(chloromethyl) diphenyl methane, 4,4'-bis(bromomethyl) diphenyl methane, 4,4'-bis(chloromethyl) diphenyl, 4,4'-bis(bromomethyl) diphenyl, 4,4'-bis(bromoacetyl) diphenyl methane, 4,4'-bis(bromoacetyl) diphenyl ether and 4,4'-bis(bromoacetyl) diphenyl. Such polymers have hereinbefore and are hereinafter referred to as butadiene-styrene-tertiary amine polymers.

The butadiene-styrene-tertiary amine polymers may also contain hydrocarbon oils well known for use in oil-extended rubbers. Such hydrocarbon extender oils include the aromatic and the naphthenic type oils and may be present in amounts from about 5 to about 50 parts by weight per 100 parts of polymer.

The rubbery compositions may contain additional components of the type normally used in compounding rubbers. Included in such additional components are fillers such as carbon black, silica and clay, plasticizers such as di-octyl phthalate and other alkyl or alkoxy esters, polyesters and coumarone-indene resins, and stabilizers for the vinyl chloride polymer and antioxidants for the other polymer components.

The rubbery compositions are compounded with conventional compounding ingredients, including fillers, plasticizers, stabilizers and curing agents, and vulcanized to yield rubber products having useful properties. Such vulcanizates may, for example, be used in hoses, rolls or roll covers and gaskets and in mechanical goods.

In order to prepare the rubbery compositions, an open mill or preferably an internal mixer is used. When using an internal mixer, the procedure is preferably that known as an upside down mix. The mill or mixer is preheated to between 90° and 120° C. and after all the components have been mixed, during which time the temperature is allowed to rise to between 150° and 175° C., mixing is continued at a controlled temperature, preferably of about 155° to 165° C., for a further 2 to 4 minutes in order to flux the blend, which is then removed from the mixer. The so-formed cooled rubbery composition may be compounded on a warm mill or in a warm internal mixer, the temperature being at no more than about 50° to 60° C., in a one or two-stage mix.

The following examples illustrate the invention but do not limit the scope thereof. All parts are parts by weight unless otherwise specified. The vulcanizates were prepared as sheets and the vulcanizate properties were determined using the ASTM procedures well known in the art. For compression set determinations, the vulcanization time was 1.5 times the vulcanization time shown and the vulcanizates were aged for 22 hours at 70° C.

EXAMPLE 1

Fluxed blends were prepared of various butadiene-acrylonitrile polymers, butadiene-styrene polymers, a polyvinyl chloride, di-octyl phthalate, a silica filler and stabilizers. The specific materials used are shown in Table I, in which the butadiene-acrylonitrile polymer contains about 34 weight percent of acrylonitrile and has a Mooney (ML 1+4 at 100° C.) of about 50, the butadiene-styrene polymer contains about 23 weight percent of styrene and about 37.5 parts by weight per 100 parts by weight of polymer of a highly aromatic oil and has a Mooney (ML 1+4 at 100° C.) of about 50, the butadiene-acrylonitrile-epoxy polymer contains about 34 weight percent of acrylonitrile and about 1 weight percent of glycidyl methacrylate and has a Mooney (ML 1+4 at 100° C.) of about 50. The butadiene-styrene-tertiary amine polymer contains about 23 weight percent of styrene and about 0.8 weight percent of dimethylaminoethyl methacrylate and had been reacted with about 0.12 weight percent of 4,4'-bis(bromomethyl) phenyl ether, contains about 37.5 parts by weight per 100 parts of weight of polymer of a highly aromatic oil and has a Mooney (ML 1+4 at 100° C.) of about 45. The polyvinyl chloride has an inherent viscosity of about 0.75 and a K-value of 59-60. The fluxed blends were prepared by an upside down mix in a lab scale Banbury, preheated to 90° C. Mixing was continued until the temperature reached 155° to 160° C. when the water to the Banbury was turned on and mixing was continued for a further two minutes with the temperature controlled at 155° to 160° C. after which the mix was dumped on to a warm (60° C.) mill and sheeted off. After resting, the fluxed blend was compounded in a lab scale Banbury maintained at 60° C.; the fluxed blend was added at zero time, the sulphur, zinc oxide, stearic acid and carbon black was added at 1.5 minutes, the clay, dioctyl phthalate, the polyester plasticizer, the polymerized 1,2-dihydro-2,2,4-trimethylquinoline and the zinc salt of 2-mercaptobenzimidazole were added at 2.5 minutes and the mix was dumped at 5 minutes. The mix was sheeted out on a cool mill and the benzothiazyl disulphide and tetramethyl thiuram monosulphide added, thoroughly dispersed and the final compound was sheeted off for vulcanization. The compounding recipe was, by weight,

| | |
|---|---|
| fluxed blend | 141.25 |
| sulphur | 1.5 |
| zinc oxide | 3 |
| stearic acid | 1 |
| carbon black (FEF) | 20 |
| clay (Dixie) | 60 |
| di-octyl phthalate | 5 |
| polyester plasticizer | 12.5 |
| polymerized 1,2-dihydro-2,2,4-trimethylquinoline | 0.5 |
| zinc salt of 2-mercaptobenzimidazole | 0.5 |
| benzothiazyl disulphide | 1.5 |
| tetramethyl thiuram monosulphide | 0.8 |

Vulcanization was for 6 minutes at 166° C. The properties of the vulcanizates are shown in Table I, where the improved properties for the composition of the invention (Experiments No. 3 and 4) are readily seen in comparison to the controls, Experiments No. 1 and 2, including the higher hardness, higher modulus and improved tear. Hot air aging and aging in ASTM Oil #1, Oil #3 and Fuel B shows that the improved properties are retained for the compositions of the invention. It is also to be noted that the fluxed blends of the compositions of the invention (Experiments No. 3 and 4) were coherent, smooth materials which handled well on the mill whereas the fluxed blends of the controls (Experiments 1 and 2) were cheesy, tended to crumble or lace on milling and were difficult to process.

TABLE I

| Experiment No. | 1 | 2 | 3 | 4 |
|---|---|---|---|---|
| A. Fluxed blend | | | | |
| Butadiene-acrylonitrile polymer | 50 | — | 50 | — |
| Butadiene-styrene polymer | 27.5 | 27.5 | — | — |
| Butadiene-acrylonitrile-epoxy polymer | — | 50 | — | 50 |
| Butadiene-styrene-tertiary amine polymer | — | — | 27.5 | 27.5 |
| Polyvinyl chloride | 30 | 30 | 30 | 30 |
| Di-octyl phthalate | | | 10 | |
| Wax lubricant | | | 2 | |
| Silica | | | 20 | |
| Stabilizer | | | 1.5 | |
| Antioxidant | | | 0.25 | |
| B. Vulcanizate properties | | | | |
| Hardness Shore A-2 | 76 | 68 | 82 | 81 |
| 100% Modulus kg/cm$^2$ | 36 | 41 | 51 | 56 |
| 300% Modulus kg/cm$^2$ | 70 | 80 | 82 | 95 |
| Tensile Strength kg/cm$^2$ | 126 | 122 | 119 | 127 |
| Elongation % | 560 | 510 | 540 | 490 |
| Tear (Die C) kg/cm | 43 | 43 | 46 | 49 |
| NBS Abrasion Index % | 34 | 32 | 37 | 41 |
| Compression Set % | 74 | 76 | 83 | 86 |

EXAMPLE 2

Following the procedure described in Example 1, further fluxed blends were prepared of the polymer mixtures described in Table II and the other components of the fluxed blends shown in Example 1. The Fluxed blends were then compounded using the same recipe and procedure of Example 1 and the formed sheets were vulcanized by heating for 7 minutes at 166° C. Table II lists the properties of the vulcanizates. A useful balance of properties can be obtained at each ratio of the polymeric components.

TABLE II

| Experiment No. | 1 | 2 | 3 | 4 | 5 |
|---|---|---|---|---|---|
| A. Fluxed Blend | | | | | |
| Butadiene-acrylonitrile polymer | 50 | 25 | 10 | 25 | 10 |
| Butadiene-styrene-tertiary amine polymer | 27.5 | 61.9 | 82.5 | 34.4 | 55 |
| Polyvinyl chloride | 30 | 30 | 30 | 50 | 50 |
| B. Vulcanizate Properties | | | | | |
| Hardness Shore A | 73 | 70 | 71 | 85 | 88 |
| 100% Modulus kg/cm$^2$ | 35 | 31 | 32 | 72 | 66 |
| 300% Modulus kg/cm$^2$ | 72 | 67 | 65 | 110 | — |
| Tensile Strength kg/cm$^2$ | 134 | 122 | 88 | 118 | 104 |
| Elongation % | 530 | 530 | 440 | 350 | 230 |
| Tear kg/cm | 39 | 42 | 39 | 49 | 34 |
| NBS Abrasion % | 39 | 33 | 30 | 30 | 20 |
| Compression set % | 66 | 71 | 72 | 72 | 75 |

EXAMPLE 3

Using the procedure described in Example 1, two fluxed blends were prepared using the recipes described in Table III. Each blend was compounded using the recipe and procedure of Example 1 and the sheets were vulcanized by heating for 7 minutes at 166° C. The properties of the vulcanizates are listed in Table III.

TABLE III

| Experiment No. | 1 | 2 |
|---|---|---|
| A. Fluxed Blend | | |
| Butadiene-acrylonitrile polymer | 50 | 50 |
| Butadiene-styrene-tertiary amine polymer | 48.1 | 48.1 |
| Polyvinyl chloride | 15 | 15 |
| Di-octyl phthalate | 10 | — |
| Wax lubricant | 2 | 2 |
| Silica | 20 | — |
| Stabilizer | 1.5 | 1.5 |
| Antioxidant | 0.25 | 0.25 |
| B. Vulcanizate Properties | | |
| Hardness Shore A | 60 | 59 |
| 100% Modulus kg/cm$^2$ | 21 | 19 |
| 300% Modulus kg/cm$^2$ | 45 | 42 |
| Tensile Strength kg/cm$^2$ | 124 | 114 |
| Enlongation % | 640 | 600 |
| Tear (Die C) kg/cm | 36 | 30 |
| NBS Abrasion Index % | 38 | 41 |
| Compression Set % | 62 | 52 |

EXAMPLE 4

Two white-filled vulcanizates were prepared and evaluated using two different fluxed blends of the invention. The polymers used to prepare the fluxed blends were, as described in Example 1, a butadiene-acrylonitrile polymer, a butadiene-acrylonitrile-epoxy polymer, a butadiene-styrene-tertiary amine polymer and a polyvinyl chloride. The fluxed blends also contained the quantities shown in Table I of di-octyl phthalate, wax lubricant, silica, stabilizer and antioxidant. The preparation of the fluxed blends was as described in Example 1.

The fluxed blends were compounded in a lab scale Banbury following the procedure of Example 1 and using the following compounding recipe:

| | |
|---|---|
| fluxed blend | 141.25 |
| sulphur | 1.5 |
| zinc oxide | 3 |
| stearic acid | 1 |
| silica | 20 |
| clay | 60 |
| di-octyl phthalate | 5 |
| polyester plasticizer | 12.5 |
| polymerized 1,2-dihydro-2,2,4-trimethylquinoline | 0.5 |
| zinc salt of 2-mercaptobenzimidazole | 0.5 |
| polyethylene glycol (mol. wt. of 4,000) | 0.5 |
| benzothiazyl disulphide | 1.5 |
| tetramethyl thiuram monosulphide | 0.8 |

Vulcanization was for 7 minutes at 166° C.

The polymer components of the fluxed blends are shown in Table IV together with the properties of the vulcanizates. Both vulcanizates show an acceptable balance of properties.

TABLE IV

| Experiment No. | A | B |
|---|---|---|
| A. Fluxed blend | | |
| Butadiene-acrylonitrile polymer | — | 50 |
| Butadiene-acrylonitrile-epoxy polymer | 50 | — |
| Butadiene-styrene-tertiary amine polymer | 27.5 | 27.5 |
| Polyvinyl chloride | 30 | 30 |
| B. Vulcanizate properties | | |
| Hardness Shore A-2 | 74 | 74 |
| 100% Modulus kg/cm$^2$ | 45 | 42 |
| 300% Modulus kg/cm$^2$ | 82 | 74 |
| Tensile strength kg/cm$^2$ | 147 | 147 |
| Elongation % | 530 | 570 |
| Tear (Die C) kg/cm | 52 | 48 |
| NBS Abrasion Index % | 36 | 38 |
| Compression Set % | 54 | 56 |

What is claimed is:

1. An improved rubbery composition which comprises, per 100 parts by weight of polymers, from about 15 to about 50 parts by weight of a vinyl chloride polymer, from about 10 to about 50 parts by weight of a butadiene-acrylonitrile polymer and from about 20 to about 60 parts by weight of a butadiene-styrene-tertiary amine polymer which contains from about 0.5 to about 10 millimoles of bound tertiary amine groups per 100 grams of polymer and which tertiary amine groups have been reacted with a dihalogen compound capable of forming quaternary ammonium salts with said tertiary amine groups.

2. The composition of claim 1 wherein said butadiene-styrene-tertiary amine polymer contains an acrylate or methacrylate of the general formula

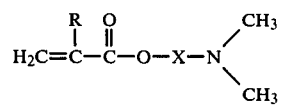

wherein R represents hydrogen or methyl and X represents an aliphatic hydrocarbon group of 2 to 4 carbon atoms.

3. The composition of claim 2 wherein said butadiene-acrylonitrile polymer contains from about 50 to about 85 weight percent of butadiene and said butadiene-styrene-tertiary amine polymer contains from about 70 to about 85 weight percent of butadiene.

4. The composition of claim 2 wherein said dihalogen compound is selected from di-bromobutene-2, α,α'-dibromo-p-xylene, 4,4'-bis(chloromethyl) phenyl ether, 4,4'-bis(bromomethyl) phenyl ether, 4,4'-bis(chloromethyl) diphenyl methane, 4,4'-bis(chloromethyl) diphenyl, 4,4'-bis(bromomethyl) diphenyl, 4,4'-bis(bromoacetyl) diphenyl methane, 4,4'-bis(bromoacetyl) diphenyl ether and 4,4'-bis(bromoacetyl) diphenyl.

5. The composition of claim 1 wherein said butadiene-acrylonitrile polymer is a butadiene-acrylonitrile polymer containing bound hydroxy or epoxy groups.

6. The composition of claim 5 wherein said polymer contains from about 4 to about 60 millimoles of bound hydroxy or epoxy groups per 100 grams of polymer.

7. The composition of claim 5 wherein said polymer contains from about 50 to about 85 weight percent of butadiene and from about 4 to about 60 millimoles of bound hydroxy or epoxy groups per 100 grams of polymer, said hydroxy or epoxy groups being provided by a copolymerizable monomer selected from glycidyl acrylate or methacrylate, vinyl cyclohexene monoxide, allyl or methallyl glycidyl ether, hydroxyethyl acrylate or methacrylate, hydroxypropyl crotonate, di(2-hydroxyethyl) maleate or fumarate and hydroxyethyl vinyl ether.

8. The composition of claim 7 wherein the butadiene-styrene-tertiary amine polymer contains from about 70 to about 85 weight percent of butadiene.

9. A process for producing the composition of claim 1 wherein the polymers are mixed on a mill or in an internal mixer which has been preheated to between 90° and 120° C., the temperature during said mixing being allowed to increase to between 150° and 175° C. after which the mixing is continued for a further 2 to 4 minutes at a temperature controlled at about 155° to 165° C.

* * * * *